(12) United States Patent
Hellström et al.

(10) Patent No.: US 7,633,978 B2
(45) Date of Patent: Dec. 15, 2009

(54) FREQUENCY STABILIZED LASER SOURCE

(75) Inventors: Jonas Hellström, Sollentuna (SE);
Gunnar Karlsson, Järfälla (SE); Håkan Karlsson, Stockholm (SE)

(73) Assignee: Cobolt AB, Solna (SE)

( * ) Notice: Subject to any disclaimer, the term of this patent is extended or adjusted under 35 U.S.C. 154(b) by 197 days.

(21) Appl. No.: 11/922,033

(22) PCT Filed: Jun. 13, 2006

(86) PCT No.: PCT/SE2006/000697

§ 371 (c)(1),
(2), (4) Date: Jan. 25, 2008

(87) PCT Pub. No.: WO2006/135318

PCT Pub. Date: Dec. 21, 2006

(65) Prior Publication Data

US 2009/0268763 A1    Oct. 29, 2009

(51) Int. Cl.
*H01S 3/10* (2006.01)
(52) U.S. Cl. .................. 372/21; 372/22; 372/29.022; 372/38.06; 372/105; 372/106
(58) Field of Classification Search .................. 372/21, 372/22, 29.022, 38.06, 105
See application file for complete search history.

(56) References Cited

U.S. PATENT DOCUMENTS

| | | | |
|---|---|---|---|
| 5,164,947 A | 11/1992 | Lukas et al. | |
| 5,381,427 A | 1/1995 | Wedekind et al. | |
| 5,809,048 A | 9/1998 | Shichijyo et al. | |
| 6,287,298 B1 | 9/2001 | Nighan et al. | |
| 6,373,868 B1 | 4/2002 | Zhang | |
| 2003/0086466 A1 | 5/2003 | Cox et al. | |
| 2006/0159136 A1* | 7/2006 | Spiekermann | 372/21 |

OTHER PUBLICATIONS

International Preliminary Report on Patentability with Written Opinion of the International Searching Authority dated Oct. 2, 2007 for International Patent Application No. PCT/SE2006/000697.

* cited by examiner

*Primary Examiner*—Dung T Nguyen
(74) *Attorney, Agent, or Firm*—Buchanan Ingersoll & Rooney PC (57) ABSTRACT

A laser arrangement is provided, in which a Lyot filter arrangement is operative to effect single mode operation. The birefringent element of the Lyot filter arrangement has a cavity folding mirror on one side thereof and a polarizing element on another side thereof, such that the free spectral range of the Lyot filter is improved. Preferably, the Lyot filter arrangement and the laser gain material are located in different branches of the folded cavity.

20 Claims, 4 Drawing Sheets

FREQUENCY STABILIZED LASER SOURCE

TECHNICAL FIELD

The present invention relates to frequency stabilized laser sources in which frequency conversion is performed within the resonant optical cavity of the laser. More particularly, the present invention relates to such laser sources which are frequency stabilized by means of a Lyot filter arrangement.

BACKGROUND AND RELATED ART

Diode-pumped solid-state lasers (DPSSL) with emission wavelengths in the visible range of the electromagnetic spectrum are well known laser systems. Products based on this general technology are widely used in material processing, bioanalysis, medicine, holography, spectroscopy, printing, graphics and entertainment, to name some applications.

A DPSSL with emission wavelengths in the visible generally comprises a DPSSL operating at a wavelength between 800 and 1400 nm, this emission being frequency converted (such as frequency doubled) to a wavelength between 400 and 700 nm. The frequency conversion is performed in a nonlinear optical material. For the case of continuous-wave (CW) laser sources, the nonlinear optical material is preferably located inside the resonant optical cavity of the laser source, in order to utilize for the nonlinear process the high intensity of the circulating optical field within the cavity. Intra-cavity frequency conversion, i.e. having the nonlinear optical material placed within the resonant cavity, has been found advantageous for the purpose of reaching high electrical-to-optical conversion efficiency in the overall laser system.

There are many factors motivating the construction of a DPSSL emitting visible light at a single frequency, i.e. to construct a single-frequency laser. Single-frequency means that only one longitudinal mode is allowed to oscillate in the optical resonator. One reason for making such a single-frequency laser is that many practical applications require, or would benefit from, a long temporal coherence length for the laser source. For a single-frequency laser, the coherence length may typically be 10 meters or more. Another reason is that intracavity frequency doubling of a fundamental laser signal having a plurality of longitudinal modes typically leads to the so-called green problem, or "green noise". Green-noise is manifested by large and irregular intensity variations in the output from the laser due to gain competition between adjacent laser modes. Such intensity variations are normally highly undesired.

For the purpose of making a typical DPSSL with a standing-wave Fabry-Perot cavity single-mode (single-frequency), spectral filters may be used which introduce substantial losses for all but the desired longitudinal mode of the laser. The present invention relates to this type of single-mode laser sources, wherein the spectral filter is a Lyot-type filter.

In its simplest form, a Lyot filter consists of a birefringent (double refractive) material and a polarizing element. The birefringent material alters the polarization state of the resonating field for all longitudinal modes, and due to the spectral dispersion of the material different modes will experience different alterations of the polarization state. Typically, a linear polarization incident upon the birefringent material will lead to polarization states after passage of this material ranging from orthogonally linear to elliptical or circular, depending on the wavelength of the respective longitudinal mode. The polarizing element is then used for introducing losses for all but the desired mode. Typically, the polarizer is placed and oriented such that one linearly polarized longitudinal mode will pass virtually unaffected through the polarizer, and will thus experience very low losses, while other modes will be sufficiently suppressed in order for oscillation thereof to be avoided. In effect, only one longitudinal mode within the gain of the laser will see sufficiently low losses in order to oscillate and provide laser light output.

A general strive when designing DPSSL:s is to obtain a laser source that is insensitive to ambient temperature changes, includes a minimum number of elements, and provides stable output at the desired wavelength.

Stability problems may also be caused by spatial hole-burning in the laser gain material. As generally known in the art, the expression "spatial hole-burning" is used for the phenomenon that the gain becomes non-uniformly distributed along the propagation direction through the gain material due to depletion of the gain for the lasing mode. If any competing mode is so spectrally shifted that the standing-wave maximum thereof is separated from that of the lasing mode, it may experience a higher gain than the desired lasing mode. Mode-hops to such competing mode may be the undesired result.

The prior art has suggested some DPSSL:s incorporating Lyot-type filters for obtaining single-mode output.

U.S. Pat. No. 5,164,947 discloses a single-frequency, frequency doubled laser wherein a nonlinear material of KTP is used both for the frequency doubling and as the birefringent material in a Lyot filter arrangement. The KTP crystal is designed for Type-II phase matching where the interacting waves have orthogonal polarizations. The effective length of the KTP crystal is temperature tuned to be an integral multiple of half the fundamental wavelength. The laser also includes a Brewster plate or a polarizing reflector, which together with the KTP crystal forms a Lyot-type filter for selecting one longitudinal mode for oscillation. One embodiment exemplified is a laser generating green light at 532 nm by frequency doubling of a Nd:YAG laser having a fundamental wavelength of 1064 nm.

U.S. Pat. No. 5,381,427 discloses a single mode laser having a Lyot filter for making the emission single-mode. The birefringent crystal included in the Lyot configuration is oriented with its optical axes at an angle of 45 degrees with respect to the polarization direction produced by a polarizer. In order to obtain single-mode operation, the birefringent crystal is carefully configured such that the ordinary ray and the extraordinary ray passing through this birefringent crystal have equal losses.

SUMMARY

In the most general sense, the present invention provides for improved stability in an intracavity frequency-converted diode-pumped solid-state laser (DPSSL laser). Improved stability according to this invention is obtained by the combined effects from a number of carefully optimized design considerations. In general, it is preferred to utilize a gain material having anisotropic gain, in order to further enhance the polarization stability of the laser.

The laser gain material should preferably be short along the propagation direction of the generated laser radiation. This is facilitated by having a gain material of high gain and short absorption depth for the pumping radiation. A particularly preferred gain material is neodymium-doped yttrium-orthovanadate (ND:YVO$_4$).

The laser cavity should have a folded geometry, wherein a folding mirror provides the combined functions of acting as a polarizer and an outcoupling mirror for frequency-converted radiation. Hence, the folding mirror provides polarization discrimination, at least to some degree, by having higher reflectivity for the preferred polarization direction than for any undesired polarization direction. It should be noted, however, that the polarization discriminating power of the folding mirror need not be very pronounced, because further polarization filtering is provided in the laser cavity as will be explained below.

The birefringent material for the Lyot arrangement is combined into the same element as the non-linear material providing frequency-conversion. This leads to fewer elements for the overall laser arrangement and thus to easier assembly and alignment. The birefringent material should be provided in a branch of the resonant cavity other than that in which the gain material is located. By locating the gain material and the birefringent material of the Lyot arrangement in different branches of the folded cavity, the stability of the laser output may be further improved, as will be shown below.

A further polarizing element, such as a Brewster window or some other type of polarizer, is arranged in the resonant cavity between the birefringent material and the end mirror in the relevant branch of the cavity. More particularly, the birefringent material has on one side the cavity folding mirror, and on the other side one of the cavity end mirrors. This arrangement of the elements will lead to a doubling of the free spectral range for the Lyot arrangement, as will be described in more detail below.

Moreover, the prior art has not adequately addressed the situation where a periodically poled nonlinear crystal is employed for frequency conversion within the resonant cavity of the laser. For example, when using quasi phase-matched frequency conversion in a periodically poled crystal located within the resonant cavity, an ordinary ray and an extraordinary ray will always suffer different losses due to the fact that quasi phase-matching is a Type-I process in which waves of the same polarization participate in the nonlinear process, thus leading to a nonlinear loss for only one of these rays.

The present invention provides for versatile and efficient generation of visible light from a DPSSL, wherein quasi phase-matching in a periodically poled nonlinear crystal is employed for the nonlinear process and a Lyot-type filter is effective to provide single-mode operation.

In particular, the birefringent crystal may be a periodically poled KTP crystal having a grating period designed for generation of green light by frequency doubling of a fundamental wave in the wavelength range 1.0-1.1 µm. The laser according to the invention then provides for stable generation of green light in a single frequency, thus substantially eliminating the renowned "green problem". However, it should be understood that any nonlinear mixing may be effected by embodiments of the present invention.

The inventors have identified and solved the problem of non-uniform losses for the ordinary and extraordinary rays in the nonlinear crystal occurring for quasi phase-matched frequency conversion. In order to facilitate efficient steady-state operation of the laser, nonlinear losses occurring for one of these rays as a consequence of the frequency conversion are balanced by an intentional introduction of similar losses also for the ray not participating in the nonlinear process. The principles behind this will be further explained in the detailed description that follows.

In addition, it is preferred in accordance with the present invention to employ a laser gain material having anisotropic gain properties, i.e. that one polarization direction is preferred over other polarization directions in the gain material. A highly suitable laser material to this end is Nd:YVO$_4$. By the use of an anisotropic gain material of this kind, the polarization state in the laser cavity is further stabilized. As will be described in more detail below, the elements included in the resonant cavity, such as the birefringent material and the Brewster plate, are arranged and located such that the favored polarization state at the gain material substantially corresponds to the direction of the highest gain in the gain material.

One apparent advantage of the present invention is that the number of discrete elements in the laser arrangement can be reduced to a minimum. This is advantageous also from a commercial point of view, in that production can be made simpler and at lower cost, and in that stability and tuning of the laser is greatly facilitated. Having fewer components to align and assemble is also a contributing factor for successful mass production.

Another advantage of the present invention is that the general laser design is suitable for generating a wide range of wavelengths, since the use of a periodically-poled crystal for the frequency conversion provides for phase-matching of any wavelengths within the transparency range of the crystal material. Only minor alterations of the design are required in order to provide for various output wavelengths. The skilled person will readily know how this should be implemented after having read and understood this description.

Further improvements of the polarization stability of the laser may be obtained by using a folded geometry for the laser resonator, wherein a folding mirror having different reflectivities for different polarization directions is employed. Typically, the polarization direction that is perpendicular to the plane defined by the folded cavity will experience the lowest losses within the cavity and will thus be further enhanced for oscillation.

It should also be understood that while the entire nonlinear crystal acts as the birefringent material of the Lyot-configuration, less than the full length of this crystal could be periodically poled for frequency conversion. In this manner, the ideal nonlinear frequency conversion (i.e. the nonlinear loss for the fundamental wave within the cavity) may be optimized independently from the depolarization required by the Lyot configuration.

BRIEF DESCRIPTION OF THE DRAWINGS

In the detailed description that follows, reference will be made to the accompanying drawings, on which.

DETAILED DESCRIPTION OF EMBODIMENTS

In order to fully appreciate the principles behind the present invention, an understanding of the Lyot-type filter in connection with a frequency-converted DPSSL is useful. By way of introduction, the Lyot-filter will be briefly explained.

The principle behind the Lyot filter is based upon polarization rotation (or alteration or "depolarization") by launching the light through a birefringent material. Dispersion in the birefringent material results in different polarization alterations for different wavelengths of incident light. For a Lyot filter located within the resonant cavity of a laser, this means that different longitudinal modes of the laser will experience different polarization changes due to the propagation through the birefringent material. Also included in the Lyot filter arrangement is some kind of polarizer, which will introduce different losses depending on the polarization state of incident light. Typically, a polarizer will pass substantially all light of a certain polarization state, while introducing losses for all other polarization states. One example of a polarizer is a Brewster plate, which has virtually full transmission (no losses) for a wave that is linearly polarized parallel to the plane of incidence. Such polarization state has a component in the orthogonal direction (normal to the plane of incidence) of zero magnitude (in other words lacks a component normal to the plane of incidence). All other polarization states have a non-zero component normal to the plane of incidence. Thus, any polarization state having a non-zero polarization component normal to the plane of incidence towards the Brewster plate will experience higher losses than the polarization state linearly polarized parallel to the plane of incidence. In a laser resonator, such polarization state will be favored for oscillation due to the regenerative nature of the laser.

For light passing through the birefringent material, there will be one or more longitudinal modes for which the overall effect is that the polarization state is substantially unaffected (i.e. light enters and leaves the birefringent material in the same polarization state). These are normally the modes that are made to pass the polarizer without attenuation.

However, the birefringent material may have an effective length such that two or more longitudinal modes of different polarization states incident upon the birefringent material are altered after passage to a polarization state that will pass the polarizer substantially without attenuation. On the passage back through the birefringent material, these longitudinal modes (now having the same polarization state) will be transformed back into different polarization states. For example, two longitudinal modes having orthogonal linear polarizations before passage of the birefringent material may both exit the birefringent material in a linear polarization state that pass virtually without attenuation through the polarizing element (Brewster window). After the second passage of the birefringent material, during propagation in the opposite direction, these two longitudinal modes will be transformed back into two orthogonal polarization states. Therefore, according to the present invention, use is made of further polarizing power at the folding mirror. In this manner, the oscillating field within the resonant cavity is forced to a polarization state allowed by both the folding mirror and the polarizer (such as a Brewster window). In effect, the free spectral range of the Lyot arrangement is doubled. As will be understood by those skilled in the art, a mirror for non-normal incidence may be designed such that the reflectivity thereof is maximum for one polarization (typically a polarization normal to the plane of incidence) and at the same time lower for another polarization (typically a polarization parallel to the plane of incidence). The folding mirror may thus provide polarizing power for the wave oscillating within the resonant optical cavity.

When a quasi phase-matching crystal is employed for efficient frequency conversion inside the resonant cavity of a laser, special measures need to be taken in order to also incorporate a Lyot-type frequency filter for obtaining single-mode oscillation. The prior art has described how a Lyot-type filter may be used in frequency-converting lasers where the nonlinear process relies on Type-II phase-matching. In Type-II phase-matching, two waves of mutually orthogonal polarizations interact to produce the frequency converted wave. For the case of frequency-doubling, equal amounts of energy is thus taken from both of the orthogonal waves (the ordinary and the extraordinary rays) during the nonlinear process. However, quasi phase-matching in nonlinear processes utilize waves of parallel polarizations for the conversion process. In prior art light sources including quasi phase-matched frequency conversion, the fundamental waves have typically been polarized along the z-axis of the nonlinear crystal, in order to take advantage of the highest nonlinear coefficient in the nonlinear material, which typically occurs for light polarized along the z-axis (e.g. in KTP).

The present invention provides for a frequency converted laser in which the nonlinear crystal is also used as the birefringent element in a Lyot-type filter arrangement. For this to be possible, the fundamental wave to be filtered by the Lyot filter must be polarized in a manner such that two different refractive indices are experienced. As an example, the fundamental wave may be linearly polarized at an angle of 45 degrees with respect to the optical axis of the nonlinear crystal. In such case, the fundamental wave will give rise to two orthogonal polarizations when taking the optical axis of the nonlinear crystal as a reference. The incident wave linearly polarized at 45 with respect to the optical axis (z-axis) of the nonlinear element can be described by a first and a second polarization component (the ordinary and the extraordinary ray), the first being parallel to the optical axis and the second being orthogonal to the optical axis of the nonlinear element. During a single pass through the nonlinear element, the fundamental wave will experience a nonlinear loss in the first component (being parallel to the optical axis and therefore participating in the frequency conversion). Hence, even if the nonlinear element has an effective length equal to an integer number of half wavelengths for the fundamental wave such that the wave exiting the nonlinear element is linearly polarized, this linear polarization will not be parallel to the incident polarization. In effect, there is introduced a rotation of the linear polarization due to the fact that one of the polarization components (i.e. the first component as described above) has experienced a loss.

The above-described rotation of the linear polarization even at "ideal" tuning of the birefringent element in the Lyot filter is a problem not adequately addressed in the prior art. This kind of polarization rotation is a consequence of using a periodically poled crystal for the frequency conversion, in which two waves of the same polarization interact.

According to the present invention, the polarization rotation is compensated for by the polarizing element being structured and arranged to introduce additional losses for the second polarization component (i.e. the polarization component which has not suffered any nonlinear loss in the nonlinear element). After one round trip through the nonlinear element and the polarizing element, the first polarization component of the fundamental wave has suffered twice the single-pass loss introduced by the nonlinear element. According to the present invention, the polarizing element is designed to introduce a similar loss for the second polarization component.

The effect of the polarizing element can also be described as follows. Suppose a linearly polarized wave of fundamental light is launched into the nonlinear element with the polarization direction at 45 degrees with respect to the z-axis of the nonlinear element. During propagation through the nonlinear element, the first component of the incident light (i.e. the component parallel to the z-axis of the nonlinear element) will experience an amplitude reduction since power is taken from this polarization component of the fundamental wave and coupled into the frequency converted wave. Hence, the favored longitudinal mode (wavelength) of the fundamental wave will exit the nonlinear element after one single pass in a polarization state that is linear, but rotated "away" from the z-axis of the nonlinear element. In other words, the light exiting the nonlinear element will have a linear polarization at an angle greater than 45 degrees with respect to the z-axis. If light of this polarization was to pass the nonlinear element a further time, the polarization would be rotated even more. In order to compensate for this effect, the polarizing element in the resonant cavity according to the invention is designed and oriented to introduce an intentional relative loss for the second polarization component compared to the first component. In effect, a first pass through the polarizing element will reset the polarization to the initial state, and a second pass (after having been reflected from one of the cavity mirrors) will "prebias" the polarization state such that the first component now has a larger amplitude than the second component. When this prebiased light passes the nonlinear element a second time, the larger amplitude of the first component is lowered due to the nonlinear loss, and the overall effect is that the fundamental wave, after one round trip, comes back to the gain element in the same polarization state it initially had.

Hence, one embodiment of the present invention utilizes the idea to introduce additional losses for the polarization component that does not participate in the nonlinear process, such that the overall round trip losses are equal for the two polarization components.

This leads to a stable, single-mode frequency-converted laser source.

In the context of the present invention, mode competition due to spatial hole-burning is minimized by using a solid-state gain material having high doping level. By virtue of the high doping level, the gain material may be made comparatively short along the optical axis of the resonant cavity, and still absorb a sufficient amount of the pump light to provide for efficient laser action. One of the cavity mirrors is preferably applied directly upon one end face of the gain material. By having a short gain material of comparatively high gain, any depletion of the gain will be substantially equal for all modes within the gain curve. As will be understood by those skilled in the art, this is obtained by the fact that the potential cavity modes are substantially in phase close to an end mirror of the resonant cavity. Thus, since any gain depletion will be substantially the same for all potential cavity modes, the risk of modes hops or multimode oscillation due to spatial hole-burning is substantially reduced.

Figure 1:
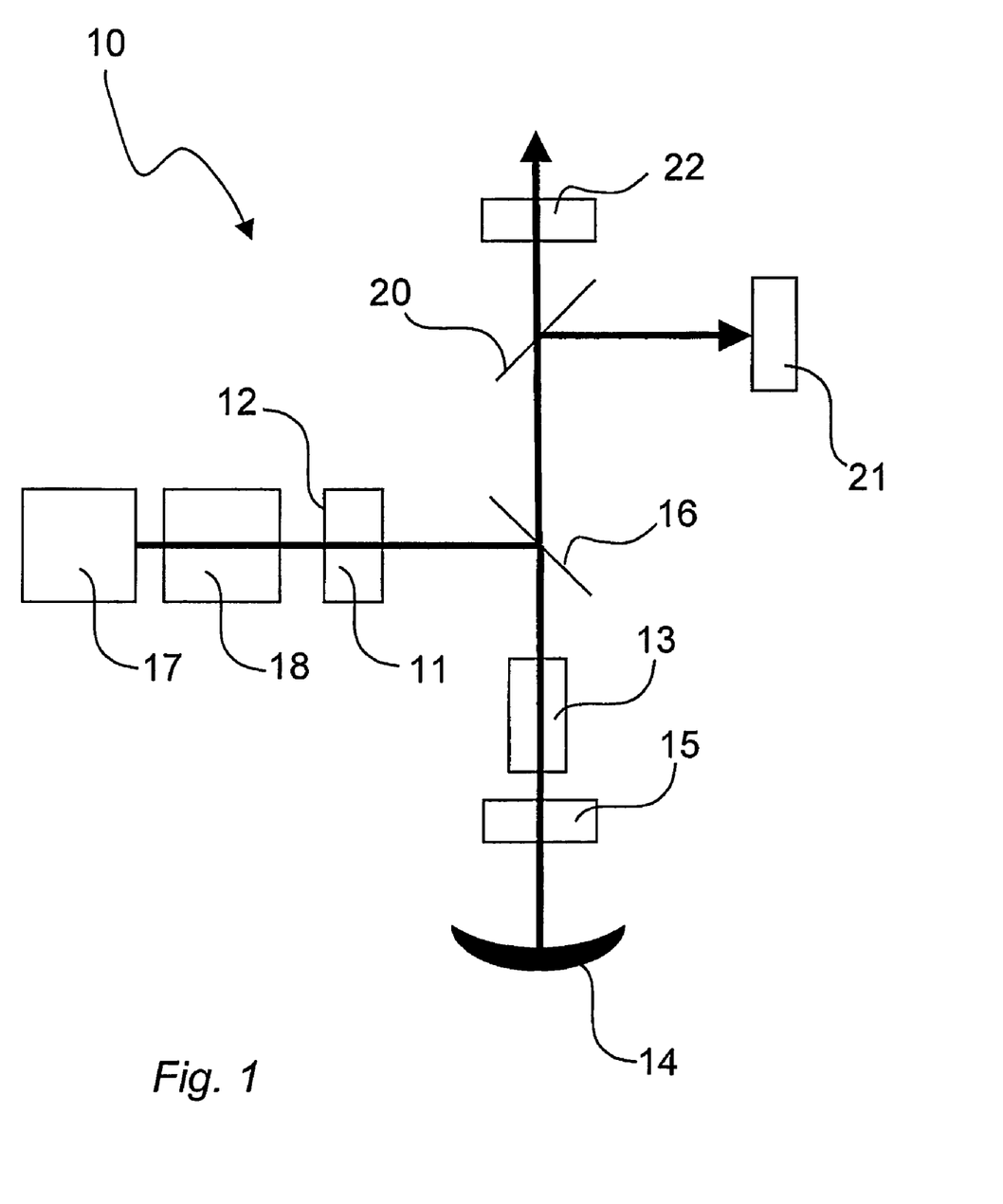
FIG. 1 shows schematically a preferred implementation of the present invention.

FIG. 1 shows schematically a preferred embodiment of the present invention. The diode-pumped solid-state laser 10 shown in the figure comprises a first 12 and a second 14 cavity end mirror, forming a resonant optical cavity. The cavity has a folded geometry and also includes a folding mirror 16. Within the resonant cavity, there is located an optically pumpable gain material 11, preferably neodymium-doped yttrium-ortho-vanadate (ND:YVO$_4$) for producing a wave of fundamental light when optically pumped. The cavity end mirrors 12 and 14 are designed to provide high reflection for this fundamental light. Within the resonant cavity there is also located a nonlinear element 13 for converting the frequency of the fundamental light produced by the gain material 11. According to the present invention, the nonlinear element 13 also functions as a birefringent element for a Lyot-type frequency filter. To complete the Lyot filter, the resonant cavity also includes a polarizing element 15, such as a Brewster plate, a polarizing mirror or the like. As shown, the resonant cavity preferably has a folded geometry, wherein the gain material 11 is located in one branch and the nonlinear element 13 in another branch of the folded geometry. By having this kind of folded geometry, frequency converted light generated in the nonlinear element 13 can be extracted from the resonant cavity by means of the folding mirror 16 without passing through the gain material 11. In addition, the laser arrangement shown in FIG. 1 comprises a source of pumping light 17, such as a diode laser or the like, and typically some kind of beam forming optics 18 for shaping the emitted beam from the pump source 17 into a suitable beam for longitudinal pumping of the gain material 11. In the embodiment shown in FIG. 1, the first cavity mirror 12 is a flat mirror which is coated directly upon the end face of the gain material 11, and the second cavity mirror 14 is a curved, separate mirror.

The preferred type of gain material 11 for use with the present invention, and particularly with the embodiment shown in FIG. 1, is Nd:YVO$_4$. This is a gain material having anisotropic gain properties in the sense that one polarization direction has a higher gain than other polarization directions. The gain material has the form of a small chip, typically with the dimensions of about 2 mm×2 mm in the plane transverse to the oscillating mode in the cavity, and a length of about 2 mm. It should be noted, however, that these exact dimensions have no important effect on the performance of the laser, but could be selected differently. However, the length of the gain material 11 will typically depend upon the amount of active ions doped into the YVO$_4$ host material. For a doping level of 0.5% Nd in the host material, the length is preferably about 2 mm according to above. Higher doping levels may also be used, for example about 1% Nd. For a gain material having about 1% Nd, the length is preferably about 1 mm. The skilled person will know how to optimize the length of the gain material for various doping levels. Nevertheless, it is generally preferred in line with this invention to have a short gain material of high gain, in order to suppress detrimental spatial hole-burning effects.

As noted, Nd:YVO$_4$ is an anisotropic gain material in which one polarization direction experience higher gain than other polarization directions. In the preferred embodiment, the gain material is oriented such that the highest gain is obtained for light polarized perpendicular to the plane of the folded cavity. Light of this polarization direction is generally known as s-polarized light, as opposed to p-polarized light (having a polarization direction parallel to the plane of the folded cavity).

The folding mirror 16 is coated for high reflection of the fundamental wavelength oscillating in the resonant cavity, and for high transmission of the generated frequency converted radiation. The orientation of the folding mirror 16 with respect to the two branches of the folded cavity is such that the polarization discrimination between s-polarized and p-polarized light is pronounced. Preferably, the folding mirror is oriented such that the angle of incidence is about 56 degrees.

The nonlinear crystal 13 is, in this example, a periodically poled crystal of KTP with a grating period suitable for phase-matching frequency doubling from 1064 nm fundamental light to 532 nm frequency converted light. The total length of the nonlinear crystal is about 5 mm, and a portion of the crystal contains the periodically poled structure.

The total length of 5 mm for the nonlinear crystal 13 is selected in order to promote the Lyot-filter action. As described above, the nonlinear crystal also acts as the birefringent crystal of the Lyot-arrangement. The Lyot-arrangement includes the nonlinear crystal 13 and the Brewster plate 15. In order for the nonlinear crystal 13 to introduce appropriate polarization alteration for the light passing the crystal, it is oriented with its optical axes (the z-axis of the crystal) at substantially 45 degrees with respect to the s-polarized oscillating light within the cavity. However, since the nonlinear crystal is designed for quasi phasematching, efficient frequency conversion takes place only for light polarized parallel to the z-axis of the nonlinear crystal. The rotation of the nonlinear crystal with respect to the polarization of the oscillating mode in the cavity leads to a splitting of the oscillating light into an ordinary ray and an extraordinary ray within the nonlinear crystal. Only one of these rays will participate in the nonlinear process (the one being parallel to the z-axis of the nonlinear crystal). Hence, the nonlinear loss experienced by the fundamental wave within the nonlinear crystal will be different for the ordinary and the extraordinary rays. In effect, even at an optimal tuning of the crystal 13 in terms of Lyot function, the fundamental wave will exit from the nonlinear crystal at a polarization state which may be linearly polarized, but not as purely s-polarized light. The overall effect will be that the linear s-polarization entering the nonlinear crystal will be rotated over an angle that depends on how large the nonlinear loss is. After reflection from the second cavity mirror 14, the fundamental wave passes the nonlinear crystal once more, which leads to a further rotation of the polarization state in the same rotational direction. Unless this rotation was compensated for, the oscillating mode within the cavity would not be stable in the s-polarization. Therefore, the Brewster plate 15 is located and oriented such that a loss similar to the nonlinear loss in the crystal 13 for one polarization component is introduced also for the other polarization component. The mutual orientation of the nonlinear crystal 13 and the Brewster plate 15 is such that the favored oscillating mode is always s-polarized at the folding mirror 16.

Another way of describing the effect of the Brewster plate in this respect is the following. After one passage of the nonlinear crystal 13, the favored longitudinal mode of the fundamental wave in the cavity is linearly polarized, but has been rotated due to the fact that only light polarized parallel to the z-axis of the crystal has experienced a nonlinear loss. The Brewster plate is oriented to intentionally introduce a similar loss also for the other polarization component (i.e. the one that did not experience any nonlinear loss within the crystal 13) when the fundamental wave passes the Brewster plate. Hence, after one passage of the Brewster plate, both the ordinary ray and the extraordinary ray have suffered similar losses. After reflection from the cavity mirror 14, the fundamental wave passes the Brewster plate once more, and the same polarization component will experience the same losses again. This may be seen as a "preforming" of the polarization state, such that the favored longitudinal mode of the fundamental wave has a substantially "pure" s-polarization after a further passage (and the ensuing nonlinear loss) of the nonlinear crystal 13. In effect, the favored longitudinal mode of the fundamental wave will always have a linear s-polarization at the folding mirror and during amplification in the gain material.

Figure 2:
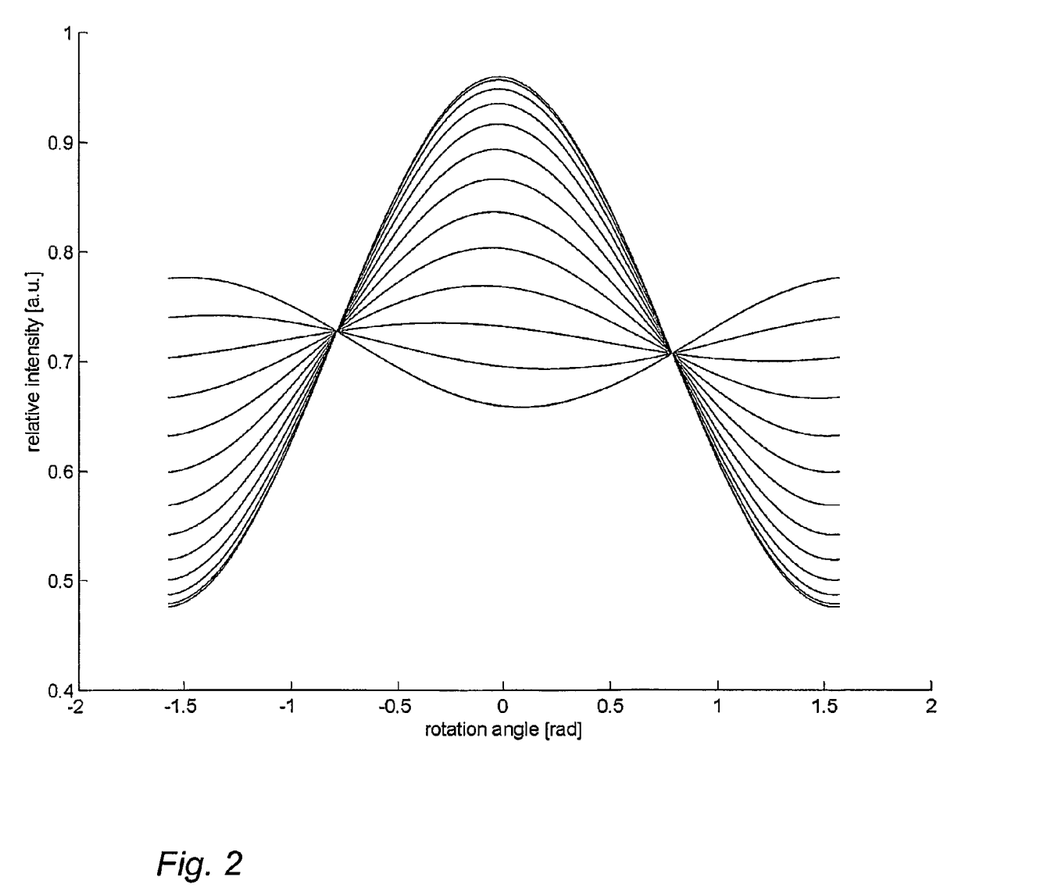
FIG. 2 shows relative intensities for a number of longitudinal modes in a resonant cavity as a function of Brewster plate detuning.

Hence, the Brewster plate is detuned from an orientation where it would have provided full transmission for s-polarized light, to an orientation where losses are introduced intentionally such that s-polarized light is obtained at the folding mirror and in the gain material. The effect of detuning the Brewster plate is shown in FIG. 2. FIG. 2 illustrates the relative intensity of a few longitudinal modes as a function of detuning angle for the Brewster plate. The curves shown in the figure are taken with the assumption that the modes are centered around 1064.0 nm and that the effective length of the birefringent element is such that the mode at 1064.0 nm exits the element in a linear polarization (effective length such that a relative phase retardation between the ordinary and the extraordinary ray of an integer times $2\pi$ is obtained). As can be seen from the figure, the favored mode has a higher relative intensity than all other modes regardless of the orientation of the Brewster plate. However, for a certain orientation of the Brewster plate, this mode has an intensity maximum corresponding to equal losses for the ordinary and the extraordinary ray (as defined by the z-axis of the nonlinear crystal). This occurs when the favored mode has s-polarization at the folding mirror (and hence in the gain material). It can be seen from the simulations shown in the figure that this requires, in this example, a detuning of the Brewster plate of about 0.02 radians (1.2 degrees). In this example, the nonlinear loss inside the crystal 13 was taken to be 4% single pass.

Figure 3:
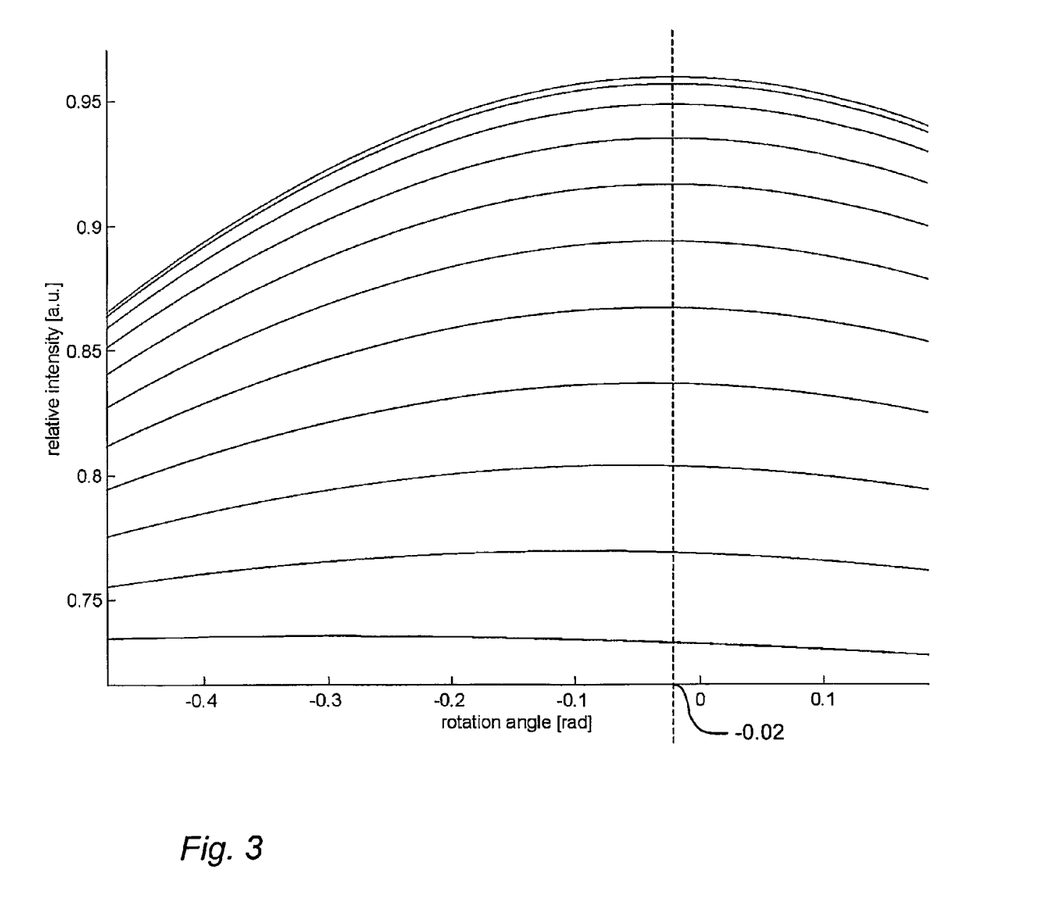
FIG. 3 is an enlarged view of a portion of FIG. 2.

FIG. 3 is an enlarged view of the local intensity maximum shown in FIG. 2. The optimal detuning of about 0.02 radians is indicated.

Figure 4:
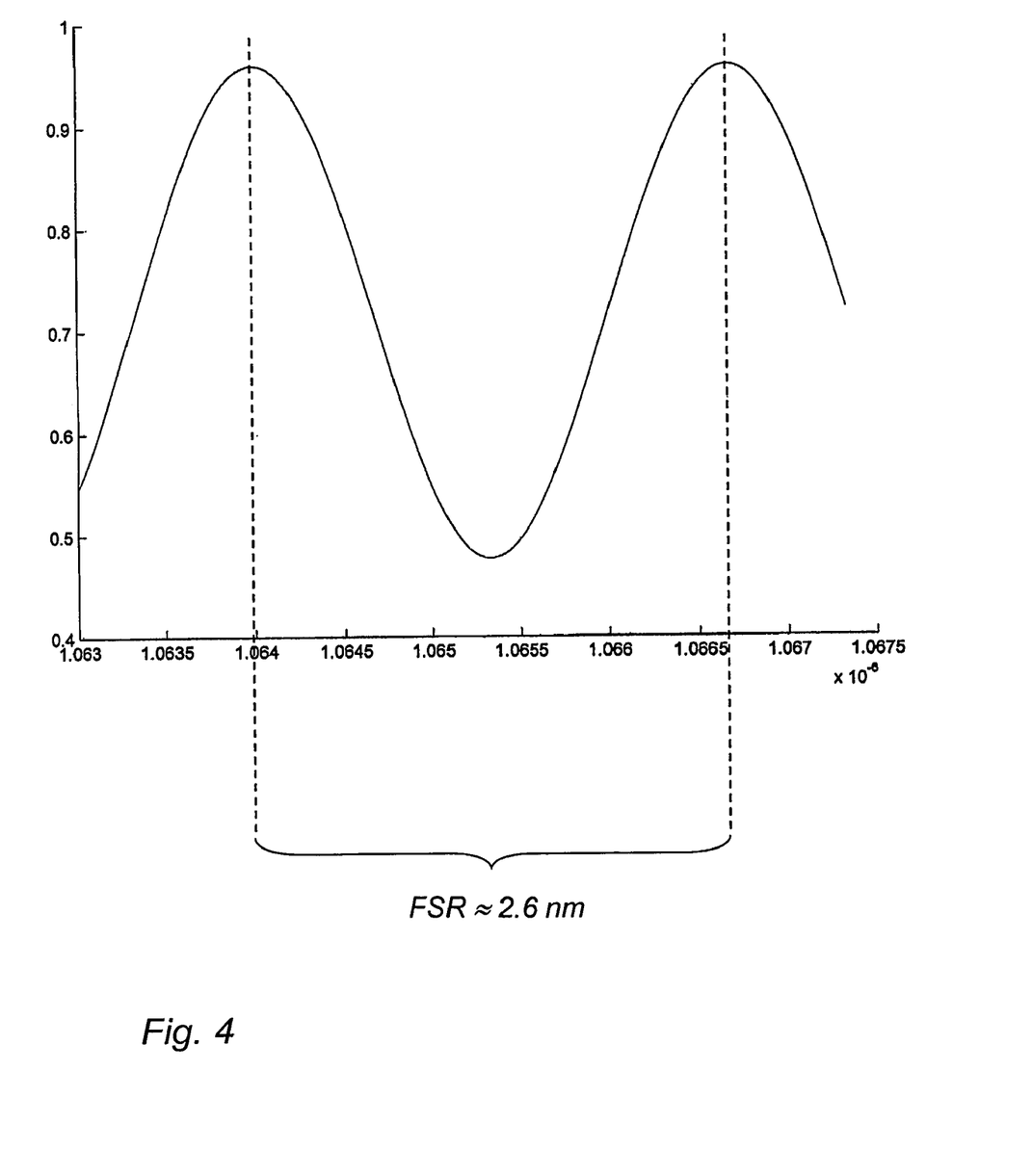
FIG. 4 shows relative intensities for different wavelengths at fixed Brewster plate detuning.

FIG. 4 shows the relative intensity for various oscillating wavelengths when the detuning of the Brewster plate is fixed at 0.02 radians. As can be seen from FIG. 4, free spectral range of the Lyot filter (i.e. the separation between intensity maxima) is about 2.6 nm. This means that the longitudinal mode at 1064.0 nm will be strongly favored for oscillation, and the laser will operate in a single longitudinal mode. Efficient and stable frequency conversion such as frequency doubling to 532 nm may thus be effected by the inventive laser arrangement.

By using an anisotropic gain material, such as Nd:YVO$_4$, the promotion of s-polarized light for oscillation within the cavity is further enhanced, provided of course that the gain material is oriented such that the highest gain is obtained for such polarization.

As shown in FIG. 1, the preferred embodiment of the present invention uses the folding mirror 16 for coupling out the frequency generated light from the cavity. Outside the cavity, there is provided a beam splitter 20 directing a small portion of the emitted light towards a detector or photo diode 21 for monitoring the operation of the laser 10. Behind the beam splitter 20, there will typically be provided further means (shown schematically at 22 in the figure) for forming or filtering the emitted light, such as a blocking-filter for blocking any remaining light at the fundamental wavelength and/or a telescope or the like for collimating the emitted frequency converted beam.

CONCLUSION

A laser arrangement is provided, in which a Lyot filter arrangement is operative to effect single mode operation. The birefringent element of the Lyot filter arrangement has a cavity folding mirror on one side thereof and a polarizing element on another side thereof, such that the free spectral range of the Lyot filter is improved. Preferably, the Lyot filter arrangement and the laser gain material are located in different branches of the folded cavity.

The invention claimed is:

1. A laser arrangement, comprising:
   a pump source for providing optical pumping radiation;
   a first and a second cavity end mirror forming a resonant optical cavity;
   an optically pumpable gain material located in said resonant optical cavity, said gain material being capable of emitting fundamental coherent radiation at a fundamental wavelength when optically pumped by said pumping radiation;
   a birefringent, nonlinear element capable of converting the frequency of said fundamental radiation;
   a polarizing element structured and arranged to provide low losses for light of a predetermined polarization state oscillating within the resonant cavity; and
   a folding mirror defining a first and a second branch for said resonant optical cavity;
   wherein said polarizing element and said folding mirror are arranged on opposite sides of the birefringent, nonlinear element, and wherein the polarizing element is arranged between the birefringent, nonlinear element and one of the cavity end mirrors in a branch of the resonant optical cavity other than the branch containing the gain material.

2. The laser arrangement according to claim 1, wherein the gain material comprises a gain material having anisotropic gain.

3. The laser arrangement according to claim 1, wherein the polarizing element is a Brewster window.

4. The laser arrangement according to claim 1,
wherein the birefringent, nonlinear element structured and arranged to convert the frequency of said fundamental radiation by quasi phase-matched nonlinear interaction, and wherein said nonlinear element is oriented with its optical axis rotated with respect to the wave emitted by the gain material, such that the wave emitted by the gain material can be described by a first component parallel to the optical axis of the nonlinear element and a second component orthogonal thereto, the nonlinear element further being designed for frequency conversion of light polarized parallel to said optical axis of the nonlinear element; and
wherein said polarizing element is oriented to introduce losses for the second component during a single pass of the fundamental save through said polarizing element equal to the nonlinear losses experienced by the first component during a single pass through the nonlinear element.

5. The laser arrangement according to claim 4, wherein the nonlinear element is a periodically poled crystal of KTP.

6. The laser arrangement according to claim 1, wherein the folding mirror is designed to pass light at the frequency converted wavelength and to reflect light at the fundamental wavelength.

7. The laser arrangement according to claim 1, wherein the folding mirror is designed to provide higher reflectivity for s-polarized light of the fundamental wavelength than for p-polarized light of the fundamental wavelength.

8. A laser arrangement according to claim 4, wherein the gain material having anisotropic gain is Nd:YVO$_4$.

9. A laser arrangement according to claim 4, wherein one of the cavity end mirrors is deposited upon a face of the gain material.

10. A laser arrangement according to claim 4, wherein the gain material having anisotropic gain is Nd:YVO$_4$, and wherein one of the cavity end mirrors is deposited upon a face of the gain material.

11. The laser arrangement according to claim 2, wherein the polarizing element is a Brewster window.

12. The laser arrangement according to claim 2,
wherein the birefringent, nonlinear element structured and arranged to convert the frequency of said fundamental radiation by quasi phase-matched nonlinear interaction, and wherein said nonlinear element is oriented with its optical axis rotated with respect to the wave emitted by the gain material, such that the wave emitted by the gain material can be described by a first component parallel to the optical axis of the nonlinear element and a second component orthogonal thereto, the nonlinear element further being designed for frequency conversion of light polarized parallel to said optical axis of the nonlinear element; and
wherein said polarizing element is oriented to introduce losses for the second component during a single pass of the fundamental save through said polarizing element equal to the nonlinear losses experienced by the first component during a single pass through the nonlinear element.

13. The laser arrangement according to claim 3,
wherein the birefringent, nonlinear element structured and arranged to convert the frequency of said fundamental radiation by quasi phase-matched nonlinear interaction, and wherein said nonlinear element is oriented with its optical axis rotated with respect to the wave emitted by the gain material, such that the wave emitted by the gain material can be described by a first component parallel to the optical axis of the nonlinear element and a second component orthogonal thereto, the nonlinear element further being designed for frequency conversion of light polarized parallel to said optical axis of the nonlinear element; and
wherein said polarizing element is oriented to introduce losses for the second component during a single pass of the fundamental save through said polarizing element equal to the nonlinear losses experienced by the first component during a single pass through the nonlinear element.

14. The laser arrangement according to claim 2, wherein the folding mirror is designed to pass light at the frequency converted wavelength and to reflect light at the fundamental wavelength.

15. The laser arrangement according to claim 3, wherein the folding mirror is designed to pass light at the frequency converted wavelength and to reflect light at the fundamental wavelength.

16. The laser arrangement according to claim 4, wherein the folding mirror is designed to pass light at the frequency converted wavelength and to reflect light at the fundamental wavelength.

17. The laser arrangement according to claim 5, wherein the folding mirror is designed to pass light at the frequency converted wavelength and to reflect light at the fundamental wavelength.

18. The laser arrangement according to claim 2, wherein the folding mirror is designed to provide higher reflectivity for s-polarized light of the fundamental wavelength than for p-polarized light of the fundamental wavelength.

19. The laser arrangement according to claim 3, wherein the folding mirror is designed to provide higher reflectivity for s-polarized light of the fundamental wavelength than for p-polarized light of the fundamental wavelength.

20. The laser arrangement according to claim 4, wherein the folding mirror is designed to provide higher reflectivity for s-polarized light of the fundamental wavelength than for p-polarized light of the fundamental wavelength.

* * * * *

UNITED STATES PATENT AND TRADEMARK OFFICE
CERTIFICATE OF CORRECTION

| | |
|---|---|
| PATENT NO. | : 7,633,978 B2 |
| APPLICATION NO. | : 11/922033 |
| DATED | : December 15, 2009 |
| INVENTOR(S) | : Jonas Hellström et al. |

It is certified that error appears in the above-identified patent and that said Letters Patent is hereby corrected as shown below:

On the title page insert item [30]:

--(30)   Foreign Application Priority Data

Jun. 14, 2005 (SE) ...................... 0501339-6--

Signed and Sealed this

Sixteenth Day of February, 2010

David J. Kappos
*Director of the United States Patent and Trademark Office*